(12) United States Patent
Nakamura

(10) Patent No.: US 11,294,364 B2
(45) Date of Patent: Apr. 5, 2022

(54) DATA PROCESSING DEVICE AND DATA PROCESSING METHOD

(71) Applicant: Mitsubishi Electric Corporation, Tokyo (JP)

(72) Inventor: Takaaki Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/119,222

(22) Filed: Dec. 11, 2020

(65) Prior Publication Data

US 2021/0096556 A1 Apr. 1, 2021

Related U.S. Application Data

(63) Continuation of application No. PCT/JP2018/025252, filed on Jul. 3, 2018.

(51) Int. Cl.
*G05B 23/02* (2006.01)
*G06F 17/18* (2006.01)
(Continued)

(52) U.S. Cl.
CPC ....... *G05B 23/024* (2013.01); *G05B 23/0221* (2013.01); *G05B 23/0235* (2013.01);
(Continued)

(58) Field of Classification Search
CPC .............. G05B 23/024; G05B 23/0221; G05B 23/0235; G05B 23/00; G06F 17/18;
(Continued)

(56) References Cited

U.S. PATENT DOCUMENTS

2015/0100534 A1* 4/2015 Ohtani ............... G05B 23/0281
706/46
2017/0132473 A1* 5/2017 Okada ...................... G06K 9/64

FOREIGN PATENT DOCUMENTS

GB 2553514 A * 3/2018 ............. G06F 17/40
JP 2004110602 A * 4/2004 ............. G06F 17/40
(Continued)

OTHER PUBLICATIONS

Gharghabi et al., "Matrix Profile VIII: Domain Agnostic Online Semantic Segmentation at Superhuman Performance Levels", Data Mining(ICDM), 2017 IEEE International Conference on IEEE, 2017, total 10 pages.

*Primary Examiner* — Daniel R Miller
*Assistant Examiner* — Christian T Bryant
(74) *Attorney, Agent, or Firm* — Birch, Stewart, Kolasch & Birch, LLP

(57) ABSTRACT

The data processing device includes: an extraction condition input unit receiving waveform data including a change point of a state of a device, parameter information about the waveform data, and transition information of the device; a similarity calculation unit calculating similarity between time-series data of the device and the waveform data; an operating mode determination unit setting the state of the device on the basis of the transition information of the device; a change point detection unit detecting the change point from the time-series data of the device on the basis of the calculated similarity and the determined state of the device, and setting a start time of a segment which is a subsequence of the time-series data and an end time of the segment; and an information output unit outputting, as segment information, the state of the device, the start time and the end time of the segment.

13 Claims, 12 Drawing Sheets

(51) Int. Cl.
  *G06F 11/32* (2006.01)
  *G06F 11/30* (2006.01)
  *G05B 23/00* (2006.01)

(52) U.S. Cl.
  CPC .............. *G06F 17/18* (2013.01); *G05B 23/00* (2013.01); *G06F 11/30* (2013.01); *G06F 11/3006* (2013.01); *G06F 11/3065* (2013.01); *G06F 11/324* (2013.01); *Y02P 90/02* (2015.11)

(58) Field of Classification Search
  CPC .. G06F 11/30; G06F 11/3065; G06F 11/3006; G06F 11/324; Y02P 90/02
  See application file for complete search history.

(56) References Cited

FOREIGN PATENT DOCUMENTS

| | | | | |
|---|---|---|---|---|
| JP | 2004-318273 | A | 11/2004 | |
| JP | 4180960 | B2 | 11/2008 | |
| WO | WO-2012103485 | A2 * | 8/2012 | ......... G01R 19/2513 |
| WO | WO 2013/051101 | A1 | 4/2013 | |

* cited by examiner

FIG. 5

| Operating Mode 501 | Number of Waveforms at Change Point 502 | Length of Waveform at Change Point 503 | Distance Measure 504 | Similarity Threshold 505 | Normalization Method 506 |
|---|---|---|---|---|---|
| First Operating Mode | 1 | 180 | Euclidean | 0.3 | None |
| Second Operating Mode | 1 | 180 | Euclidean | 0.4 | Z Normalization |
| Third Operating Mode | 1 | 120 | Euclidean | 0.3 | Z Normalization |
| Fourth Operating Mode | 1 | 240 | Euclidean | 0.45 | Z Normalization |
| Fifth Operating Mode | 1 | 240 | Euclidean | 0.25 | Z Normalization |
| Sixth Operating Mode | 2 | 180 | Euclidean | 0.25 | Z Normalization |
| ... | | | ... | | ... |

FIG. 6

| | First Operating Mode | Second Operating Mode | Third Operating Mode | Fourth Operating Mode | Fifth Operating Mode | Sixth Operating Mode | Seventh Operating Mode | Eighth Operating Mode | Ninth Operating Mode | Tenth Operating Mode | Eleventh Operating Mode | Twelfth Operating Mode | Thirteenth Operating Mode | Fourteenth Operating Mode | Fifteenth Operating Mode |
|---|---|---|---|---|---|---|---|---|---|---|---|---|---|---|---|
| First Operating Mode | ※ | | | | | | | | | | | | | | |
| Second Operating Mode | | 1 | | | | | | | | | | | | | |
| Third Operating Mode | | | 1 | | | | | | | | | | | | |
| Fourth Operating Mode | | | | 1 | | | | | | | | | | | |
| Fifth Operating Mode | | | | | 1 | | | | | | | | | | |
| Sixth Operating Mode | | | | | | 1 | | | | | | | | | |
| Seventh Operating Mode | | | | | | | 1 | | | | | | | | |
| Eighth Operating Mode | | | | | | | | 1 | | | | | | | |
| Ninth Operating Mode | | | | | | | | | 1 | | | | | | |
| Tenth Operating Mode | | | | | | | | | | 1 | | | | | |
| Eleventh Operating Mode | 1 | | | | | | | | | | 1 | | | | |
| Twelfth Operating Mode | | | | | | | | | | | | 1 | | | |
| Thirteenth Operating Mode | | | | | | | | | | | | | 1 | | |
| Fourteenth Operating Mode | | | | | | | | | | | 1 | | | 1 | |
| Fifteenth Operating Mode | | | | | | | | | | | | | | | 1 |

DATA PROCESSING DEVICE AND DATA PROCESSING METHOD

CROSS REFERENCE TO RELATED APPLICATIONS

This application is a Continuation of PCT International Application No. PCT/JP2018/025252 filed on Jul. 3, 2018, which is hereby expressly incorporated by reference into the present application.

TECHNICAL FIELD

The present invention relates to a technique for analyzing time-series data.

BACKGROUND ART

A control system for controlling a plant process is introduced in a power plant such as a thermal power plant, a hydropower plant, or a nuclear power plant, a chemical plant, an iron and steel plant, or a water supply and sewerage plant. A control system for controlling air conditioning, electricity, lighting, water supply and drainage, etc. is also introduced in facilities such as buildings and factories. In these control systems, various kinds of time-series data observed over time by a sensor attached to a device are accumulated.

Similarly, in an information system relating to economy or management, time-series data in which values such as stock prices or sales are recorded over time is accumulated.

Conventionally, there is a technique for analyzing the state of a plant, equipment, or management by analyzing changes in values of the time-series data. As one method for analyzing the state of plant, equipment, or management, time-series data is divided into, for example, subsequences (hereinafter referred to as segments) by operating modes of plant or equipment, and through comparison of segments of the same operating mode, the degree of deviation of data or the tendency of data is assessed to determine an anomaly or deterioration of equipment.

For example, Patent Literature 1 discloses a data analysis device that analyzes data in each manufacturing process relating to a plurality of products. In a case where the data in each manufacturing process is time-series data that varies or may vary along the time axis, the device divides the time-series data along the time axis on the basis of an event occurrence timing in a schedule of the manufacturing process in which the time-series data is generated, and calculates a feature value for the divided segment.

CITATION LIST

Patent Literature

Patent Literature 1: JP 2004-318273 A

SUMMARY OF INVENTION

Technical Problem

In order to extract a segment for each of events generated by subdividing the manufacturing process, the data analysis device disclosed in Patent Literature 1 described above needs to acquire event information indicating the timing at which the event occurs in the schedule of the manufacturing process. Therefore, the data analysis device disclosed in Patent Literature 1 has a problem that, if there is no event information, the segment of the event section cannot be extracted.

The present invention has been accomplished to address the above problems, and an object of the present invention is to accurately extract a segment for each operating mode even when there is no event information indicating an event occurrence timing.

Solution to Problem

The data processing device according to the present invention includes: processing circuitry to receive inputting of waveform data including a change point of a state of a device, parameter information about the waveform data, and transition information of the device; to calculate similarity between time-series data of the device and the waveform data; to set the state of the device on the basis of the transition information of the device; to detect the change point from the time-series data of the device on the basis of the similarity and the state of the device, and to set a start time of a segment which is a subsequence of the time-series data and an end time of the segment; and to output, as segment information, the state of the device, the start time of the segment, and the end time of the segment.

Advantageous Effects of Invention

According to the present invention, it is possible to accurately extract a segment for each operating mode even when there is no event information indicating an event occurrence timing.

BRIEF DESCRIPTION OF DRAWINGS

FIG. 5 is a diagram showing a parameter list of the data processing device according to the first embodiment.

FIG. 6 is a diagram showing operating mode transition information of the data processing device according to the first embodiment.

DESCRIPTION OF EMBODIMENTS

In order to describe the present invention in more detail, modes for carrying out the present invention will now be described with reference to the accompanying drawings.

First Embodiment

Figure 1:
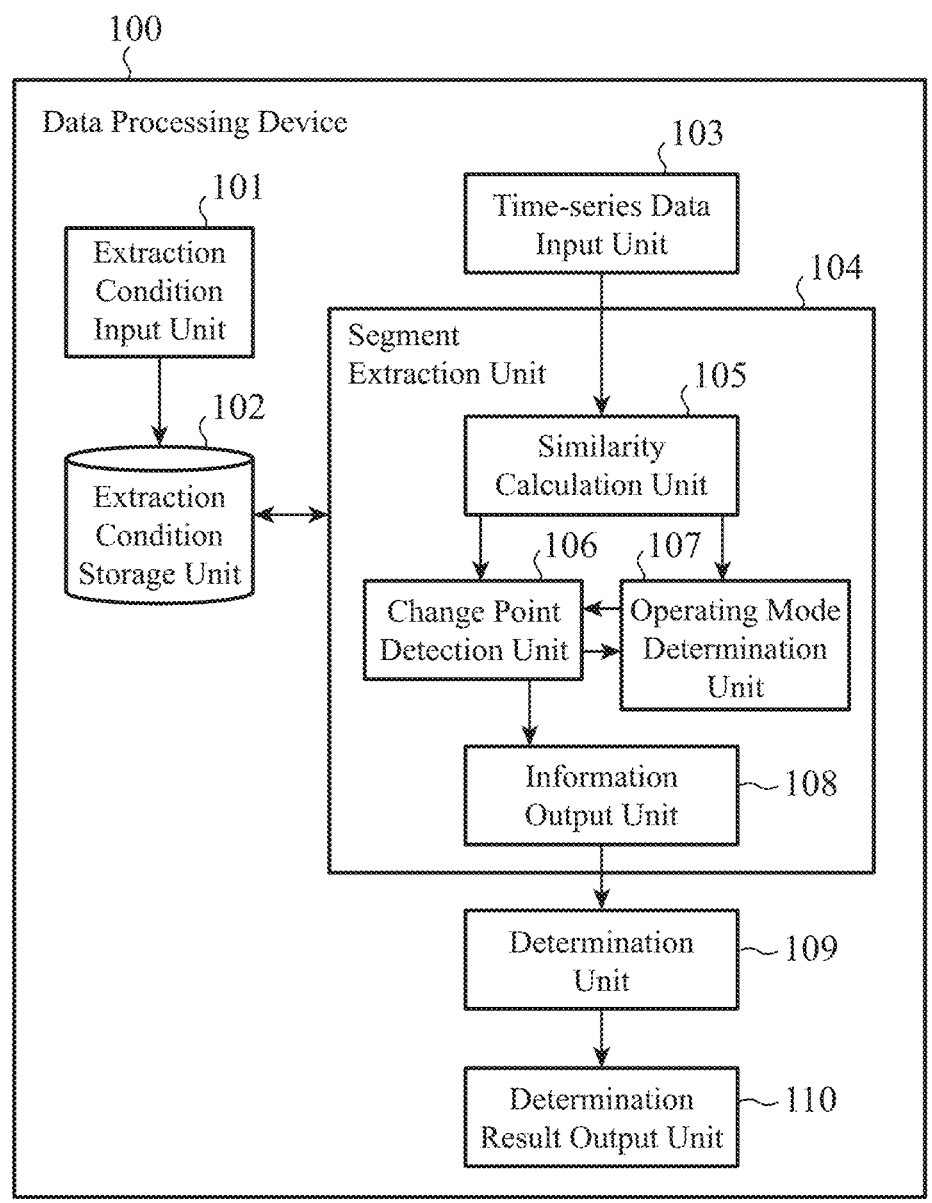
FIG. 1 is a block diagram showing a configuration of a data processing device according to a first embodiment.

FIG. 1 is a block diagram showing the configuration of a data processing device 100 according to the first embodiment.

The data processing device 100 includes an extraction condition input unit 101, an extraction condition storage unit 102, a time-series data input unit 103, a segment extraction unit 104, a determination unit 109, and a determination result output unit 110. Further, the segment extraction unit 104 includes a similarity calculation unit 105, a change point detection unit 106, an operating mode determination unit 107, and an information output unit 108.

In FIG. 1, the extraction condition input unit 101 and the extraction condition storage unit 102 are configured to perform preparation processing before the data processing device 100 starts detection processing. Further, the time-series data input unit 103, the segment extraction unit 104, the determination unit 109, and the determination result output unit 110 are configured to perform operational processing for, when receiving inputting of time-series data, extracting subsequences (hereinafter referred to as segments) by operating modes of a device to be analyzed, and determining anomaly or deterioration of the device to be analyzed.

The extraction condition input unit 101 receives inputting of a segment extraction condition. The extraction condition input unit 101 stores the received segment extraction condition in the extraction condition storage unit 102. The segment extraction condition includes waveform data at change point (waveform data), parameter list (parameter information), and operating mode transition information (transition information of the device). The segment extraction condition described above will be described later in detail. The extraction condition storage unit 102 is a storage area that stores the segment extraction condition.

The time-series data input unit 103 receives inputting of time-series data of the device to be analyzed. The time-series data input unit 103 outputs the received time-series data to the similarity calculation unit 105 of the segment extraction unit 104.

The time-series data is a sequence of values obtained by sequentially observing the device to be analyzed over time. Here, the time-series data of the device to be analyzed will be described as an example, but the time-series data may be any data. For example, it may be time-series data accumulated in a control system for controlling a process of a power plant such as a thermal power plant, a hydropower plant, or a nuclear power plant, a chemical plant, an iron and steel plant, or a water supply and sewerage plant. In addition, it may be, for example, time-series data accumulated in a control system for controlling air conditioning, electricity, lighting, water supply and drainage, etc. in facilities (for example, buildings and factories). Further, it may be, for example, time-series data accumulated in a device on a factory line, a device mounted on an automobile, a device mounted on a railway car, or the like. Further, it may be time-series data accumulated in an information system relating to economy or management. A specific example of the time-series data will be described later.

The segment extraction unit 104 extracts a segment from the time-series data received by the time-series data input unit 103 in accordance with the segment extraction condition stored in the extraction condition storage unit 102.

Specifically, the similarity calculation unit 105 calculates the similarity at each time between the input time-series data and waveform data at each change point stored in the extraction condition storage unit 102. The similarity calculation unit 105 outputs the time-series data and the calculated similarity to the change point detection unit 106. The change point detection unit 106 detects the change point of the state of the time-series data on the basis the input similarity. The change point detection unit 106 outputs information about the detected change point and information about the operating mode of the device to the information output unit 108.

The operating mode determination unit 107 refers to the operating mode transition information stored in the extraction condition storage unit 102, and sets the current operating mode of the device and the next operating mode to which the current operating mode can be transited. Note that the operating mode determination unit 107 may set a plurality of next operating modes. The change point detection unit 106 detects a change point on the basis of the current operating mode of the device and the next operating mode of the device set by the operating mode determination unit 107.

When receiving the information about the change point and the information about the operating mode of the device from the change point detection unit 106, the information output unit 108 outputs, to the determination unit 109, the current operating mode, the segment start time, and the segment end time as segment information. The determination unit 109 analyzes the input segment information, and determines an anomaly of the device, deterioration of the device, or the like on the basis of the degree of deviation of data, the tendency of data, or the like. The determination unit 109 outputs the determination result to the determination result output unit 110. The determination result output unit 110 outputs the input determination result to the outside.

Next, a hardware configuration example of the data processing device 100 will be described.

Figure 2A:
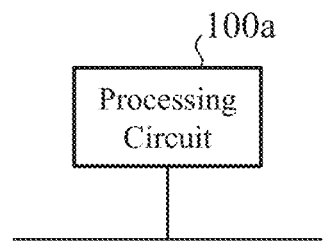
FIG. 2A and FIG. 2B are diagrams showing a hardware configuration example of the data processing device.
Figure 2B:
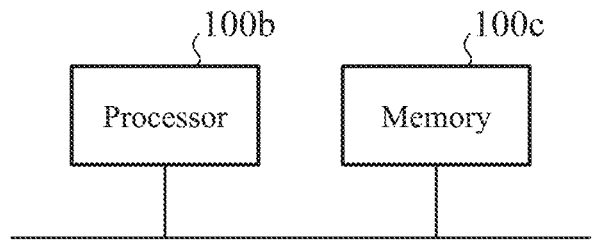

FIG. 2A and FIG. 2B are diagrams showing a hardware configuration example of the data processing device 100.

The functions of the extraction condition input unit 101, the time-series data input unit 103, the similarity calculation unit 105, the change point detection unit 106, the operating mode determination unit 107, the information output unit 108, the determination unit 109, and the determination result output unit 110 in the data processing device 100 are implemented by a processing circuit. That is, the data processing device 100 includes a processing circuit for implementing the above functions. The processing circuit may be a processing circuit 100a that is dedicated hardware as shown in FIG. 2A, or a processor 100b that executes a program stored in a memory 100c as shown in FIG. 2B.

In a case where the extraction condition input unit 101, the time-series data input unit 103, the similarity calculation unit 105, the change point detection unit 106, the operating mode determination unit 107, the information output unit 108, the determination unit 109, and the determination result output unit 110 are implemented by dedicated hardware as shown in FIG. 2A, the processing circuit 100a is, for example, a single circuit, a composite circuit, a programmed processor, a parallel programmed processor, an application specific integrated circuit (ASIC), a field-programmable gate array (FPGA), or a combination of some of these circuits. Each of the functions of the extraction condition input unit 101, the time-series data input unit 103, the similarity calculation unit 105, the change point detection unit 106, the operating mode determination unit 107, the information output unit 108, the determination unit 109, and the determination result output unit 110 may be implemented by a corresponding one of processing circuits, or may be collectively implemented by a single processing circuit.

In a case where the extraction condition input unit 101, the time-series data input unit 103, the similarity calculation unit 105, the change point detection unit 106, the operating mode determination unit 107, the information output unit 108, the determination unit 109, and the determination result output unit 110 are implemented by the processor 100b as shown in FIG. 2B, the functions of the respective units are implemented by software, firmware, or a combination of software and firmware. Software and firmware are described as programs and stored in the memory 100c. The processor 100b implements the functions of the extraction condition input unit 101, the time-series data input unit 103, the similarity calculation unit 105, the change point detection unit 106, the operating mode determination unit 107, the information output unit 108, the determination unit 109, and the determination result output unit 110 by reading and executing programs stored in the memory 100c. That is, the extraction condition input unit 101, the time-series data input unit 103, the similarity calculation unit 105, the change point detection unit 106, the operating mode determination unit 107, the information output unit 108, the determination unit 109, and the determination result output unit 110 include memories 100c for storing programs to eventually execute the later-described steps in FIG. 7 when being executed by the processor 100b. In addition, these programs are considered to cause a computer to execute the procedures or methods of the extraction condition input unit 101, the time-series data input unit 103, the similarity calculation unit 105, the change point detection unit 106, the operating mode determination unit 107, the information output unit 108, the determination unit 109, and the determination result output unit 110.

Here, the processor 100b is, for example, a central processing unit (CPU), a processing device, a computing device, a processor, a microprocessor, a microcomputer, or a digital signal processor (DSP).

The memory 100c is, for example, a nonvolatile or volatile semiconductor memory such as random access memory (RAM), read only memory (ROM), flash memory, erasable programmable ROM (EPROM), or electrically EPROM (EEPROM), a magnetic disk such as a hard disk or a flexible disk, or an optical disk such as a mini disk, a compact disk (CD), or a digital versatile disc (DVD).

Note that part of the functions of the extraction condition input unit 101, the time-series data input unit 103, the similarity calculation unit 105, the change point detection unit 106, the operating mode determination unit 107, the information output unit 108, the determination unit 109, and the determination result output unit 110 may be implemented by dedicated hardware, and another portion may be implemented by software or firmware. As described above, the processing circuit of the data processing device 100 can implement the abovementioned functions by hardware, software, firmware, or a combination thereof.

Next, an example of the time-series data input to the time-series data input unit 103 will be described with reference to FIG. 3.

Figure 3:
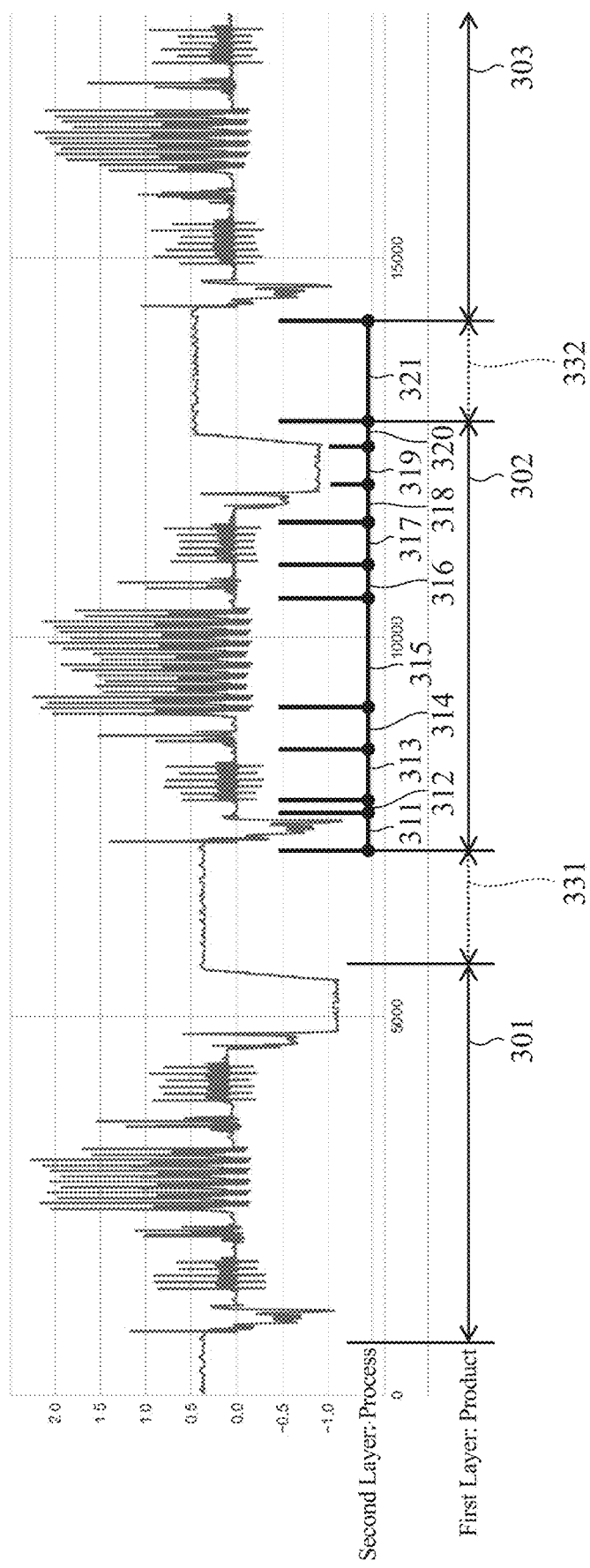
FIG. 3 is a diagram showing an example of time-series data of the data processing device according to the first embodiment.

FIG. 3 is a diagram showing an example of time-series data of the data processing device 100 according to the first embodiment.

In a production line of high-mix low-volume production, multiple types of products with different specifications are produced on the same production line. The manufacturing procedure of products includes a plurality of processes, and a device for manufacturing products switches the operation according to a recipe. The data measured by a sensor installed in the device used in the production line shows a characteristic waveform for each process. When the manufacturing procedure changes, the waveform itself, the duration and the order of appearance of the waveform for each process, and the like change. The time-series data of the data measured by the sensor mounted on the device has the following two-layer structure.

First layer: Product pattern corresponding to each lot of products (first lot 301, second lot 302, third lot 303 in FIG. 3)

Second layer: Process pattern corresponding to process (first process 311 to eleventh process 321 in FIG. 3)

There are an idling period 331 between the first lot 301 and the second lot 302, and an idling period 332 between the second lot 302 and the third lot 303. In FIG. 3, the idling period 332 is indicated as the eleventh process 321.

Each process described above corresponds to each operating mode. In order that the determination unit 109 accurately detects an anomaly of the device, deterioration of the device, or the like from, for example, the time-series data shown in FIG. 3, it is effective to divide the time-series data into segments corresponding to the respective operating modes, and compare the segments.

Next, the segment extraction condition stored in the extraction condition storage unit 102 will be described with reference to FIGS. 4 to 6.

The segment extraction condition includes waveform data at change point (FIG. 4), parameter list (FIG. 5), and operating mode transition information (FIG. 6).

The basic idea of segment extraction is that the waveform at a change point of a segment is registered as a condition, and when a pattern similar to that of the change point appears on the time-series data, it is determined that the operating mode has been switched. Due to the determination of the switching of the operating mode using the waveform at a change point as the condition, it is possible to focus on only the change point and extract a segment even in the operating mode in which the duration is variable. In addition, even if a pattern different from a normal pattern temporarily appears in the segment due to a factor such as an anomaly of the device, the segment can be determined only on the basis of the change point, whereby the segment can be extracted without being affected by an anomaly of the device, or the like.

Figure 4:
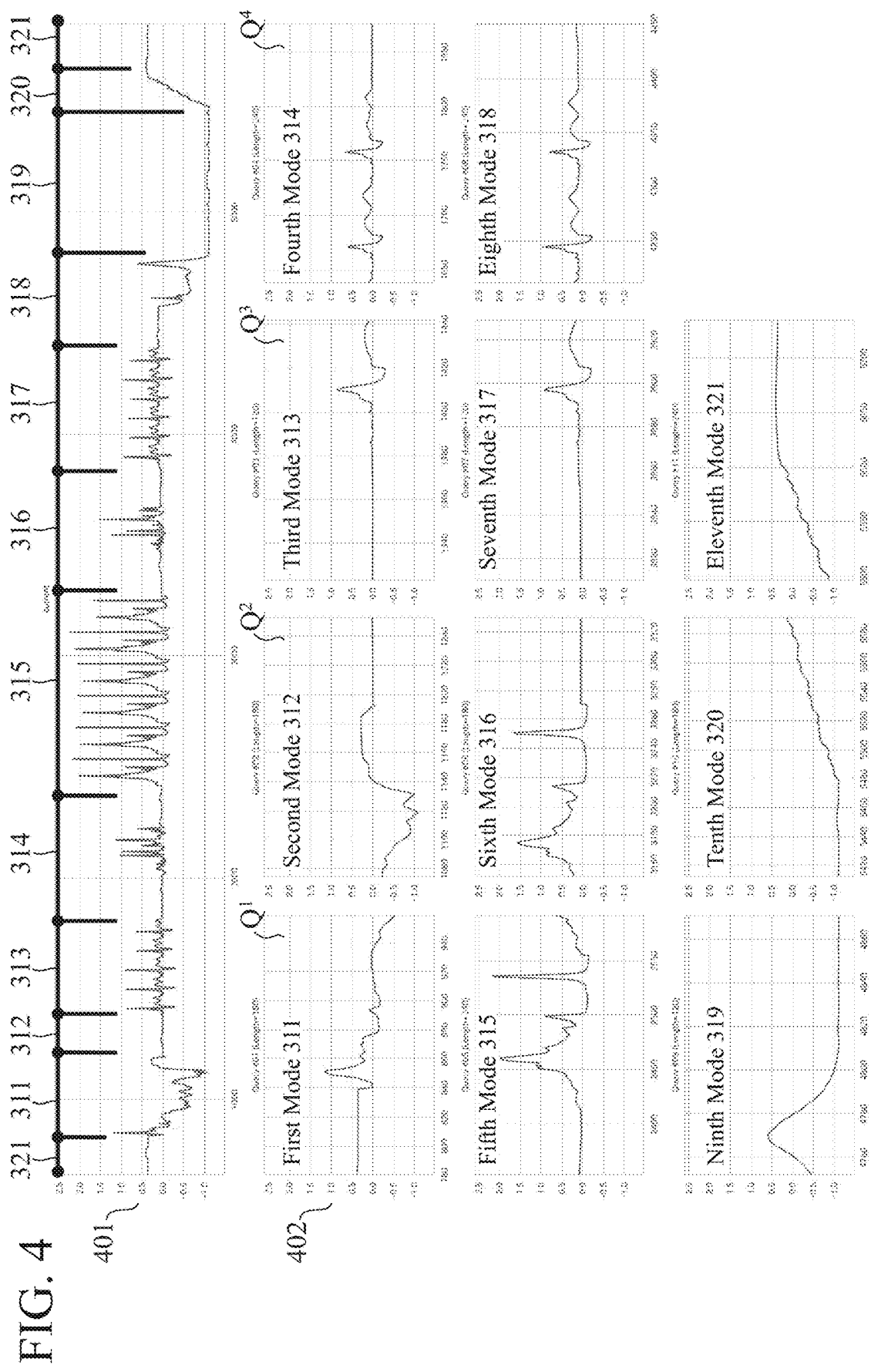
FIG. 4 is a diagram showing waveform data at change point of the data processing device according to the first embodiment.

FIG. 4 is a diagram showing waveform data at change point of the data processing device 100 according to the first embodiment.

The waveform data at change point is selected from data at the time when the device is in a healthy state immediately after maintenance and the device starts to operate stably. In the example of FIG. 4, time-series data 401 of the first lot 301 selected from FIG. 3 is selected. A change point of each process is detected from the time-series data 401, and waveform data 402 at the detected change point is selected. As described above, each process corresponds to the operating mode, and thus, the waveform data 402 at change point is the waveform data of each operating mode. In the waveform data 402 shown in FIG. 4, the waveform data labeled as the first operating mode means "a pattern when the operating mode changes from the eleventh operating mode to the first operating mode". Note that the waveform data at the change point may be selected for a plurality of lots.

FIG. 5 is a diagram showing a parameter list of the data processing device 100 according to the first embodiment.

The parameter list contains the following elements.

Operating mode 501: Information indicating the corresponding operating mode

Number of waveforms at change point 502: Information indicating the number of waveform data at a change point (may be omitted if the number of waveform data can be fixed)

Length of waveform at change point 503: Information indicating the length of a waveform at a change point (may be omitted because it can be determined from the waveform data at change point)

Distance measure 504: Information indicating an index of similarity (may be omitted if a default value is identified)

Similarity threshold 505: Information indicating a threshold of similarity (when the similarity exceeds the threshold 505, it is determined as a change point of the operating mode)

Normalization method 506: Information indicating normalization (may be omitted if the default value is identified)

The details of the normalization method 506 will be described later.

FIG. 6 is a diagram showing operating mode transition information of the data processing device 100 according to the first embodiment.

The operating mode transition information is information in which the dependence relationship between operating modes is recorded in the form of an adjacency matrix. The first row of the table shown in FIG. 6 indicates identification information of the previous operating mode, and the first column indicates identification information of the next operating mode. For example, "1" shown in the second row and third column means that "the operating mode next to the first operating mode is the second operating mode".

Further, the mark "*" in the table means that it is the initial operating mode. The initial operating mode is, for example, the initial operating mode immediately after the idling periods 331 and 332 in the time-series data shown in FIG. 3. On the other hand, an element in the table where nothing is indicated means that there is no direct dependence relationship between the corresponding operating modes. FIG. 6 shows an example in which the operating mode transition information is recorded in the form of an adjacency matrix, but any form can be applied as long as similar information can be recorded. In addition, when there is only one type of dependence relationship between operating modes, the operating mode transition information may not be provided.

Next, a method for calculating the similarity between the time-series data and the waveform data at change point by the similarity calculation unit 105 will be described.

First, the time-series data is a sequence of ordered real numbers expressed by the following Equation (1).

$$T = t_1, t_2, \ldots, t_i \quad (1)$$

In Equation (1), "$t_i$" ($1 \leq i \leq n$) is the observed value at time "i". "n" is the length of the time-series data.

A subsequence obtained by extracting a part of the time-series data is expressed by the following Equation (2).

$$T_{i,w} = t_i, t_{i+1}, \ldots, t_{i+w-1} \quad (2)$$

In Equation (2), $1 \leq i \leq (n-w+1)$. "w" represents the length of the subsequence.

Although various types of similarity index of the distance measure 504 shown in FIG. 5 can be applied, the Euclidean distance can be applied when the shape of the time-series data is to be strictly determined. In a case where the waveform at the change point is expressed by the following Equation (3), the Euclidean distance dist $(T_{i,w}, Q)$ between the segment $T_{i,w}$ and Q having the same length "w" can be obtained by the following Equation (4).

$$Q = q_1, q_2, \ldots, q_w \quad (3)$$

$$dist(T_{i,w}, Q) = \sqrt{\sum_{j=0}^{w-1} (t_{i+j} - q_{j+1})^2} \quad (4)$$

In a case where the Euclidean distance is applied as an index of similarity, two waveforms are more similar (have higher similarity) when the value is closer to "0", and the two waveforms deviate (have lower similarity) as the value is larger.

In addition to the Euclidean distance, Manhattan distance can be applied, and if expansion and contraction in the time direction are allowed, dynamic time warping (DTW) is also applicable as an index of similarity. Further, in a case where similarity in change tendency is used for the determination, a correlation coefficient may be used as an index of the similarity. In the following, a case where the Euclidean distance is applied as an index of similarity will be described as an example.

When a change in the operating mode is detected on the basis of the similarity between the time-series data and the waveform at the change point, it is desirable that the similarity is higher around the change point and lower in other periods. Therefore, selection of the waveform data at change point and other parameters is the key point.

It is desirable to select the waveform data at the change point so that the feature before and after the change point can be captured. For example, in the waveform data at the change point of the first operating mode in the waveform data at change point shown in FIG. 4, the actual change point is at X=840. The waveform data immediately before the change point (X=840) has almost a constant value, and therefore, the waveform data immediately before the change point is cut out in a period having a length of 60 (X=780 to 840). On the other hand, since the waveform data immediately after the change point (X=840) keeps on vertically varying, the waveform data is cut out in a period having a length of 120 (X=840 to 960). Due to such selection, it is possible to cut out a waveform which is specific to the change point of the first operating mode and which sharply increases and sharply decreases after keeping an almost constant value, and finally, gradually decreases.

The next key point for detecting a change in the operating mode is the normalization method 506 shown in FIG. 5.

In the calculation of similarity between the time-series data and the waveform data at the change point, it may be desirable to apply some kind of normalization. Examples of normalization are expressed in the following Equations (5)

to (7). Equation (5) indicates min-max normalization for converting the range of the subsequence to a range from 0 to 1.

$$T_i^N = \frac{t_i - \min(T_{i,w})}{\max(T_{i,w}) - \min(T_{i,w})} \quad (5)$$

Equation (6) indicates z-normalization for performing conversion such that the range of the subsequence has a mean of 0 and a standard deviation of 1.

$$T_i^N = \frac{t_i - \mathrm{mean}(T_{i,w})}{std(T_{i,w})} \quad (6)$$

Equation (7) indicates level normalization for performing conversion such that the subsequence has a mean of 0.

$$T_i^N = t_i - \mathrm{mean}(T_{i,w}) \quad (7)$$

In Equations (5) to (7) described above, time-series data obtained by normalizing time-series data T is expressed as $T^N$. Further, the function "min", the function "max", the function "mean", and the function "std" represent the minimum value, the maximum value, the mean value, and the standard deviation of $T_{i,w}$, respectively.

Empirically, if the waveform is simple like the waveform of the ninth operating mode, the ability to detect the change point is higher without normalization. On the other hand, if the waveform repeatedly varies vertically, and the amplitude has variability, like the waveform of the fifth operating mode, the ability to detect the change point is increased by applying min-max normalization expressed by Equation (5) or z-normalization expressed by Equation (6). If the time-series data is affected by external factors such as the outside temperature, and if there is no change in the waveform but there are fluctuations in the range, the ability to detect the change point is increased by applying the level normalization expressed by Equation (7).

Next, the operation of the operational processing out of the preparation processing and the operational processing of the data processing device 100 will be described.

Figure 7:
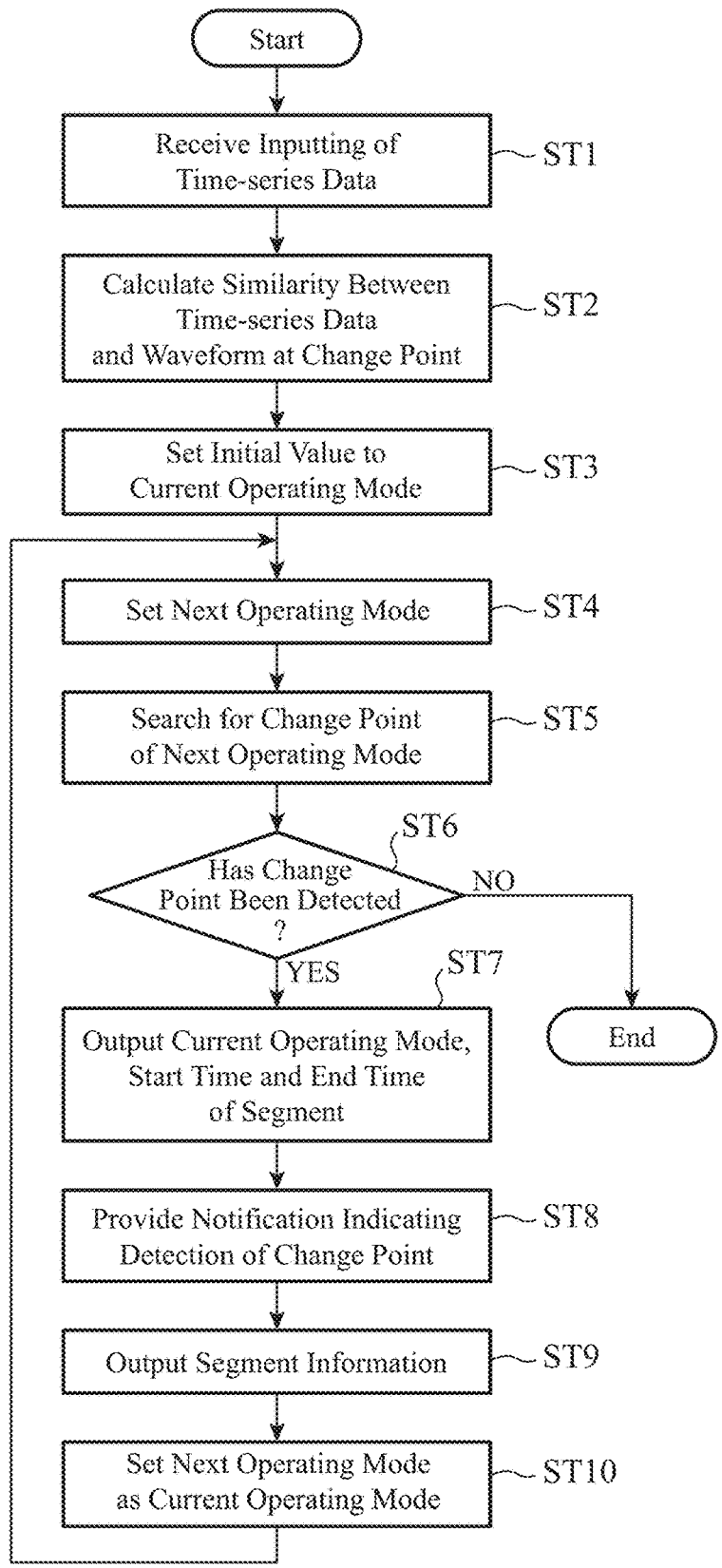
FIG. 7 is a flowchart showing an operation of operational processing of the data processing device according to the first embodiment.

FIG. 7 is a flowchart showing the operation of the operational processing of the data processing device 100 according to the first embodiment. In the following description, it is supposed that, in FIG. 7, the time-series data received by the time-series data input unit 103 is collectively processed in a preset period.

The time-series data input unit 103 receives inputting of time-series data (length: n) from which a segment is to be extracted (step ST1). The time-series data input unit 103 outputs the received time-series data to the similarity calculation unit 105. The subsequent steps are executed in accordance with the conditions stored in the extraction condition storage unit 102.

The similarity calculation unit 105 refers to the input time-series data and the waveform data at each change point stored in the extraction condition storage unit 102, and calculates the similarity at each time between the time-series data and the waveform data at the change point (step ST2). When the current operating mode is known to the user, the operating mode determination unit 107 also receives inputting of the current operating mode together with the inputting from the extraction condition input unit 101 or the time-series data input unit 103, and sets an initial value (step ST3). For example, if the time-series data from which a segment is to be extracted starts from an idle state of the device, the eleventh operating mode shown in FIG. 4 is set to the current operating mode. Alternatively, the first operating mode may always be set as the default value.

Next, the operating mode determination unit 107 refers to the operating mode transition information stored in the extraction condition storage unit 102, and sets, as the next operating mode, an operating mode to which the current operating mode can be transited (step ST4).

In the example of the operating mode transition information shown in FIG. 6, assuming that the current operating mode is the eleventh operating mode, the first operating mode is set as the next operating mode. A plurality of operating modes may be set as the next operating mode. The operating mode determination unit 107 outputs the set next operating mode to the change point detection unit 106.

The change point detection unit 106 searches for a change point of the input next operating mode (step ST5). The change point detection unit 106 determines whether or not a change point is detected (step ST6). When not detecting the change point (step ST6; NO), the change point detection unit 106 ends the processing. Depending on a target device, an unusual behavior may appear in the time-series data due to predetermined maintenance even during stable operation. Therefore, when a change point cannot be detected, the operating mode determination unit 107 may set the next operating mode as the first operating mode (first operating mode in the example of FIG. 6) again and restart the processing from the process of step ST5.

On the other hand, when detecting a change point (step ST6; YES), the change point detection unit 106 outputs the current operating mode, the segment start time, and the segment end time to the information output unit 108 (step ST7), and notifies the operating mode determination unit 107 of information indicating that the change point has been detected (step ST8).

The information output unit 108 outputs, as segment information, a set of the current operating mode, the segment start time, and the segment end time to the determination unit 109 (step ST9). The operating mode determination unit 107 sets the next operating mode set in step ST4 as the current operating mode on the basis of the notification indicating that the change point has been detected (step ST10). Then, the flowchart returns to the process of step ST4 and repeats the above processing.

The process of each step shown in the flowchart of FIG. 7 will be described in detail.

First, the process of step ST2 described above will be described in detail.

The similarity calculation unit 105 acquires, from the extraction condition storage unit 102, waveform data $Q^k$ at a change point of each operating mode "k", the length $w^k$ of the waveform data at the change point (length of waveform at change point 503 shown in FIG. 5), a similarity index (distance measure 504 shown in FIG. 5), and a normalization method (normalization method shown in FIG. 5). Next, in the following Equation (8), a similarity time series $S^k$ is acquired by changing a time "i" from 1 to $n-w^k+1$.

$$S_i^k = \mathrm{dist}(T_{i,wk}, Q^k) \quad (8)$$

In a case where the normalization method 506 is specified, the similarity needs to be calculated by normalizing $T_{i,wk}$ and $Q^k$ in advance. In a case where waveform data pieces at multiple change points are selected for one operating mode, similarity time series $S^{k1}$ to $S^{km}$ are calculated from waveform data pieces $Q^{k1}$ to $Q^{km}$ at the respective change points and lengths $w^{k1}$ to $w^{km}$ of the waveform data pieces. Next, as shown in the following Equation (9), the minimum value of the calculated similarity time series $S^{k1}$ to $S^{km}$ at each time "i" is set as the final value of the similarity time series $S^k$.

$$S^k_i = \min(S^{k1}_i, \ldots, S^{km}_i) \quad (9)$$

Further, if dist $(T_{i,w}, Q)$ is Euclidean distance, Manhattan distance, or DTW, the similarity depends on the length w of the waveform data Q at the change point. Therefore, if the lengths are different, they cannot be simply compared. In that case, $Sk_i$ is divided by the square root of the length w (Euclidean distance, DTW) or the length w (Manhattan distance), and then the minimum value is obtained.

Figure 8:
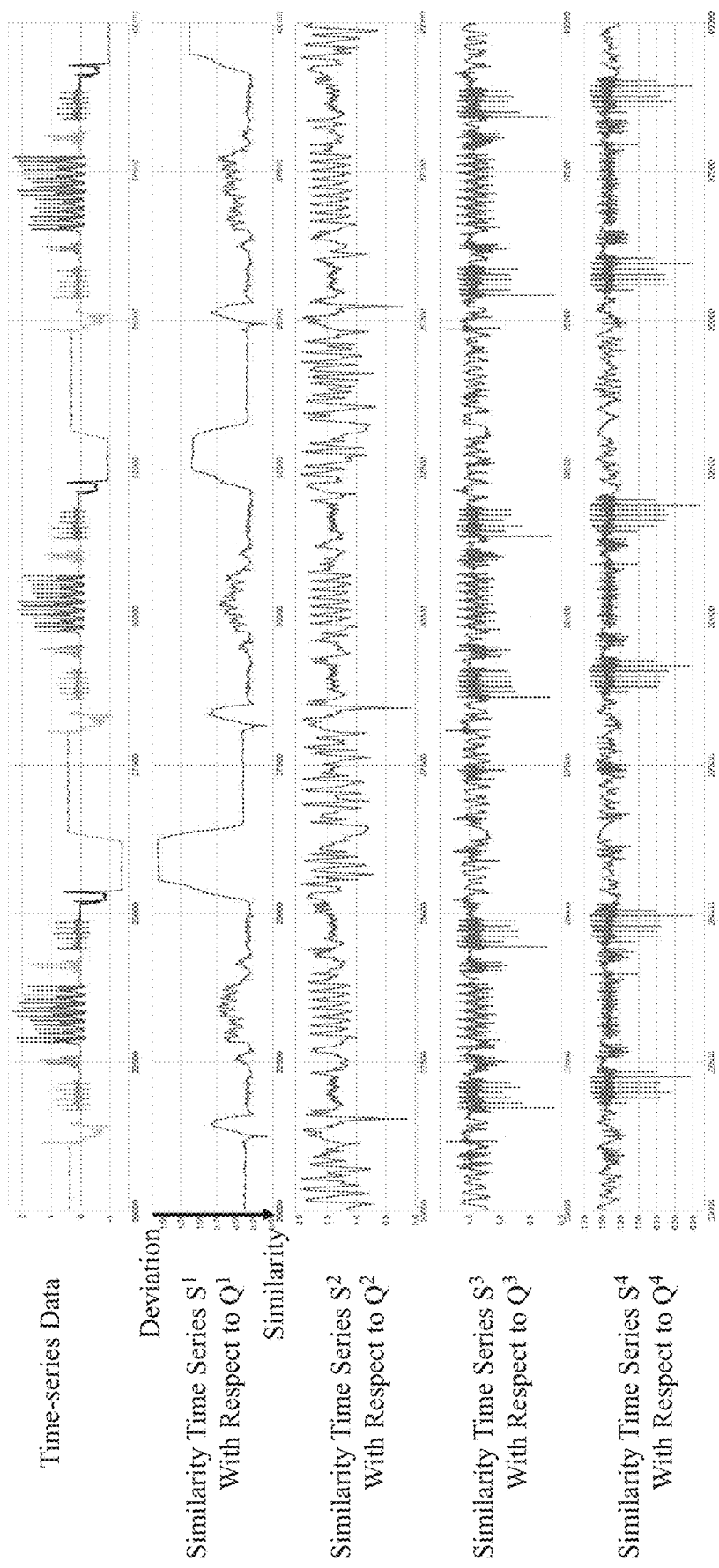
FIG. 8 is a diagram showing an output example of similarity time series of the data processing device according to the first embodiment.

FIG. 8 is a diagram showing an output example of the similarity time series of the data processing device 100 according to the first embodiment.

FIG. 8 shows output examples of the similarity time series $S^1$ to $S^4$ calculated for the first waveform data $Q^1$ to the fourth waveform data $Q^4$ at the change points of the first operating mode to the fourth operating mode shown in FIG. 4. The calculated similarity time series has a minimum value at the change point of the operating mode.

Next, the process of step ST5 described above will be described in detail.

The change point detection unit 106 searches from the start time start of the similarity time series $S^k$ of the next operating mode "k", and sets, as the end time end of the current segment, the first change point, that is, a time "j" at which $S^k$ assumes a minimum value and is equal to or less than the similarity threshold (similarity threshold 505 shown in FIG. 5). If there are multiple next operating modes, the operating mode first satisfying the conditions is determined as the next operating mode. In a case where DTW is applied as the similarity index (distance measure 504 shown in FIG. 5), the minimum value may be similarly selected, and in a case where a correlation coefficient is applied, the maximum value may be selected on the contrary.

When the time "j" is set as the end time end of the current segment as described above, a set of [eleventh operating mode, start time start "1", end time end "j"] is output as the segment information in the process of step ST6. Further, in the process of step ST8, the current operating mode is set to the first operating mode, and "j+1" is set to the segment start time so that the search is restarted from the time next to the time "j".

Figure 9:
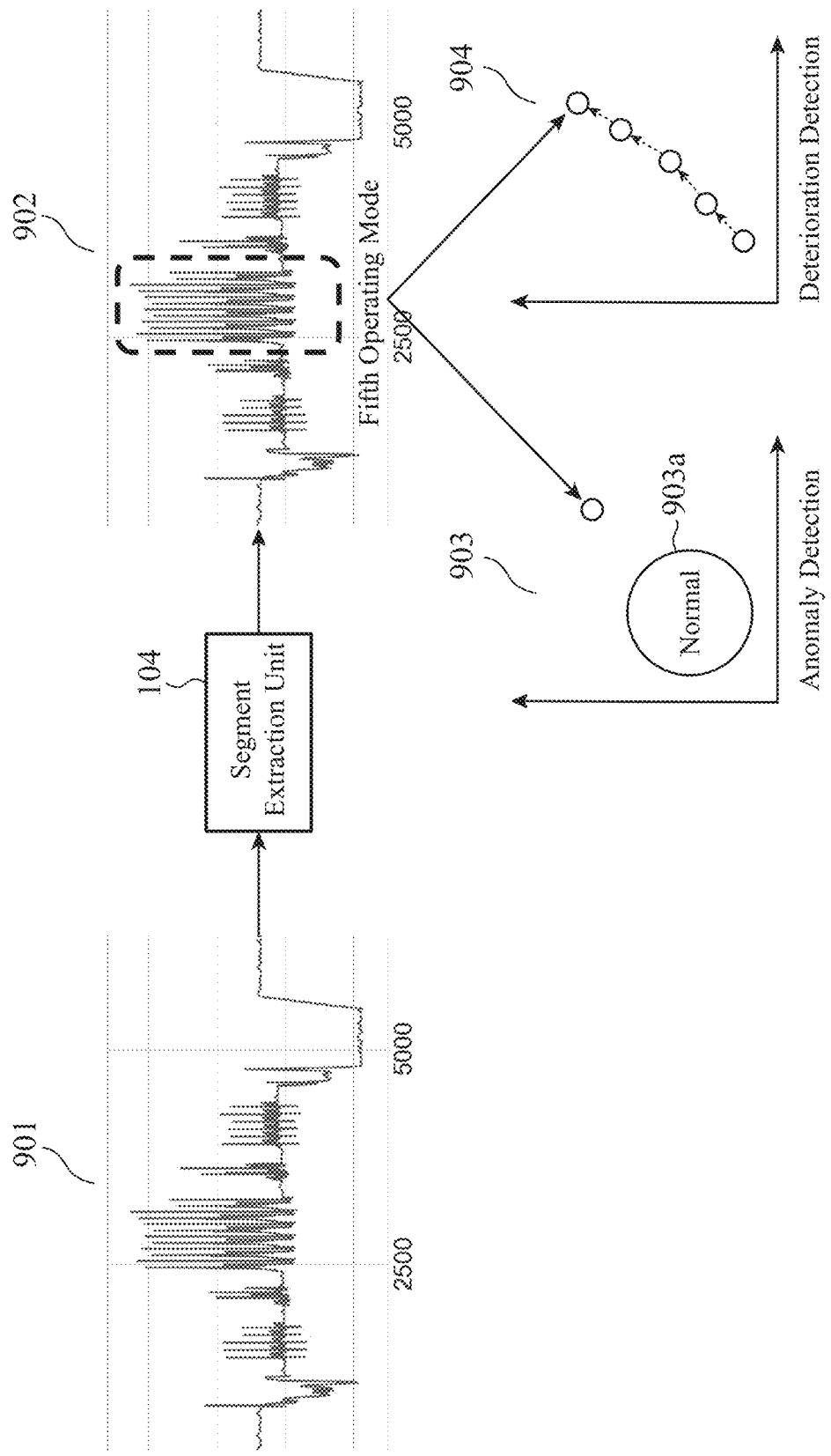
FIG. 9 is a diagram showing the concept of anomaly determination processing and deterioration determination processing by the determination unit of the data processing device according to the first embodiment.

FIG. 9 is a diagram showing the concept of anomaly determination processing and deterioration determination processing by the determination unit 109 of the data processing device 100 according to the first embodiment.

When the time-series data input unit 103 receives inputting of time-series data 901, the segment extraction unit 104 extracts segment information 902. Note that FIG. 9 shows an example of segment extraction in the fifth operating mode.

In anomaly determination processing 903, an anomaly is determined on the basis of a degree of deviation of data from the normal range of data in the corresponding operating mode. First, the determination unit 109 sets the value of the segment or the range of the feature value of the segment during a period in which the device is normally operating stably (for example, one week after maintenance, or until 100 lots of products are produced), as a normal range 903a of the corresponding operating mode. Thereafter, if the segment value or the segment feature value of the segment information 902 extracted by the segment extraction unit 104 is outside the normal range 903a, the determination unit 109 determines that the device has an anomaly.

In the deterioration determination processing 904, deterioration of the device is determined from the tendency of the segment data. The determination unit 109 plots the values of the segments or the feature values of the segments for each product lot in chronological order, and determines that the device is deteriorated when the deviation increases over time.

The anomaly determination result and the deterioration determination result by the determination unit 109 are output to the outside via the determination result output unit 110.

When extracting a segment from the time-series data of an anomaly determination target and a deterioration determination target, the segment extraction unit 104 may not be able to correctly extract the segment due to the influence of signs of anomaly and deterioration included in the time-series data. In that case, the segment extraction unit 104 extracts a segment from time-series data that has a dependence relationship with the time-series data of the anomaly determination target and the deterioration determination target and is not affected by the anomaly and deterioration of the device. Further, the segment extraction unit 104 may be configured to extract a segment by applying the extracted segment information to the time-series data of the anomaly determination target and the deterioration determination target. For example, in a case where it is known that, when a torque of a motor changes depending on a pressure applied to the device from the outside, signs of anomaly and deterioration appear in the time-series data of the torque, the segment extraction unit 104 extracts a segment from the time-series data of the pressure applied from the outside. The segment extraction unit 104 cuts out a segment of torque using the extracted segment information, and determines anomaly of the device and deterioration of the device.

In addition, a segment value or a segment feature value may vary even during the execution of the anomaly determination processing and deterioration determination processing because of inspection or cleaning of the device, and therefore, a segment may not be extracted under the segment extraction condition so far. However, even in such a case, segment extraction is enabled only by newly selecting waveform data at change point of an operating mode while the device is stably operating after maintenance, updating the parameters shown in FIG. 5, and storing the updated parameters into the extraction condition storage unit 102.

In the above description, the time-series data is collectively processed in a preset period, but time-series data can be sequentially processed using the same structure.

For example, it is assumed that time-series data is input to the time-series data input unit 103 every observation sampling period. When the data at time "j" is input, the similarity calculation unit 105 adds the similarity between $T_{j-wk+1,wk}$ and $Q^k$ to the similarity time series $S^k$. The change point detection unit 106 only needs to search the time corresponding to the change point between the segment start time start and the time "j−wk+1".

As described above, in the first embodiment, the data processing device 100 includes: the extraction condition input unit 101 that receives inputting of waveform data including a change point of a state of the device, parameter information about the waveform data, and transition information of the device; the similarity calculation unit 105 that calculates similarity between time-series data of the device and the waveform data; the operating mode determination unit 107 that sets the state of the device on the basis of the transition information of the device; the change point detection unit 106 that detects the change point from the time-series data of the device on the basis of the calculated similarity and the determined state of the device, and sets a start time of a segment which is a subsequence of the time-series data and an end time of the segment; and the information output unit 108 that outputs, as segment information, the state of the device, the start time of the segment, and the end time of the segment.

As a result, even when there is no event information indicating an event occurrence timing, a segment of each operating mode of the device can be accurately extracted. In addition, the operating mode can be accurately identified on the basis of the waveform data of the segment. Moreover, by extracting the segment on the basis of the change point, it is possible to extract a variable-length segment in the time direction.

Further, according to the first embodiment, the similarity calculation unit 105 is configured to calculate the similarity using the Euclidean distance between a subsequence cut out from the time-series data and the time-series data having the same length as the subsequence. Thus, highly accurate segment information can be generated, and an anomaly of the device, deterioration of the device, or the like can be accurately determined.

Further, according to the first embodiment, the change point detection unit 106 is configured to detect, as the change point, a time at which the similarity assumes a minimum value and the similarity is less than or equal to a predetermined threshold from a similarity time series including similarities calculated by the similarity calculation unit 105 for each time of the time-series data. Therefore, the similarity can be accurately determined.

Second Embodiment

Figure 10:
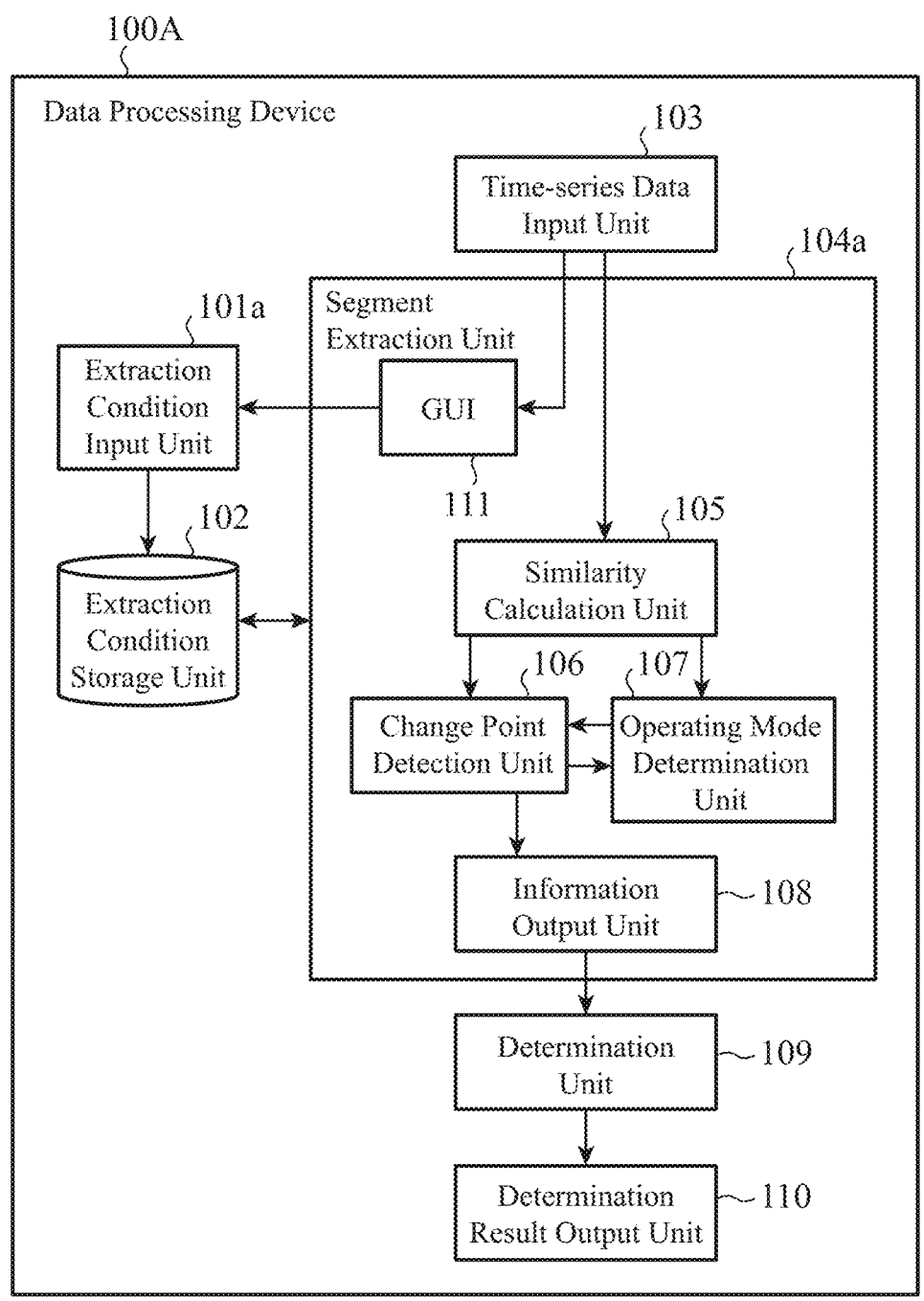
FIG. 10 is a block diagram showing a configuration of a data processing device according to a second embodiment.

The second embodiment describes a configuration including a graphical user interface (GUI). FIG. 10 is a block diagram showing the configuration of a data processing device 100A according to the second embodiment.

The data processing device 100A according to the second embodiment is configured so that a segment extraction unit 104a of the data processing device 100 in the first embodiment is further provided with a GUI 111, and includes an extraction condition input unit 101a in place of the extraction condition input unit 101. In the following, the same or corresponding parts as those of the data processing device 100 according to the first embodiment will be denoted by the same reference numerals as those used in the first embodiment, and the description thereof will be omitted or simplified.

The segment extraction unit 104a includes the GUI 111 described below to reduce a load of the preparation processing before the detection processing is started. The GUI 111 receives inputting of time-series data from the time-series data input unit 103, and performs control so that time-series data 1001 during a period in which the device is normally and stably operating is displayed on a display device (not shown) such as a display. The GUI 111 performs control for enlarging time-series data in the time-series range specified by the user with respect to the displayed time-series data and displaying the data on the display device. The extraction condition input unit 101a causes the extraction condition storage unit 102 to store the waveform data at change point selected by the user and the segment extraction condition of the waveform data.

Next, a hardware configuration example of the data processing device 100A will be described. The description of the same configuration as that of the first embodiment is omitted.

The GUI 111 and the extraction condition input unit 101a in the data processing device 100A correspond to the processing circuit 100a shown in FIG. 2A or the processor 100b that executes the program stored in the memory 100c shown in FIG. 2B.

Next, a specific processing operation of the GUI 111 will be described with reference to FIG. 11.

Figure 11:
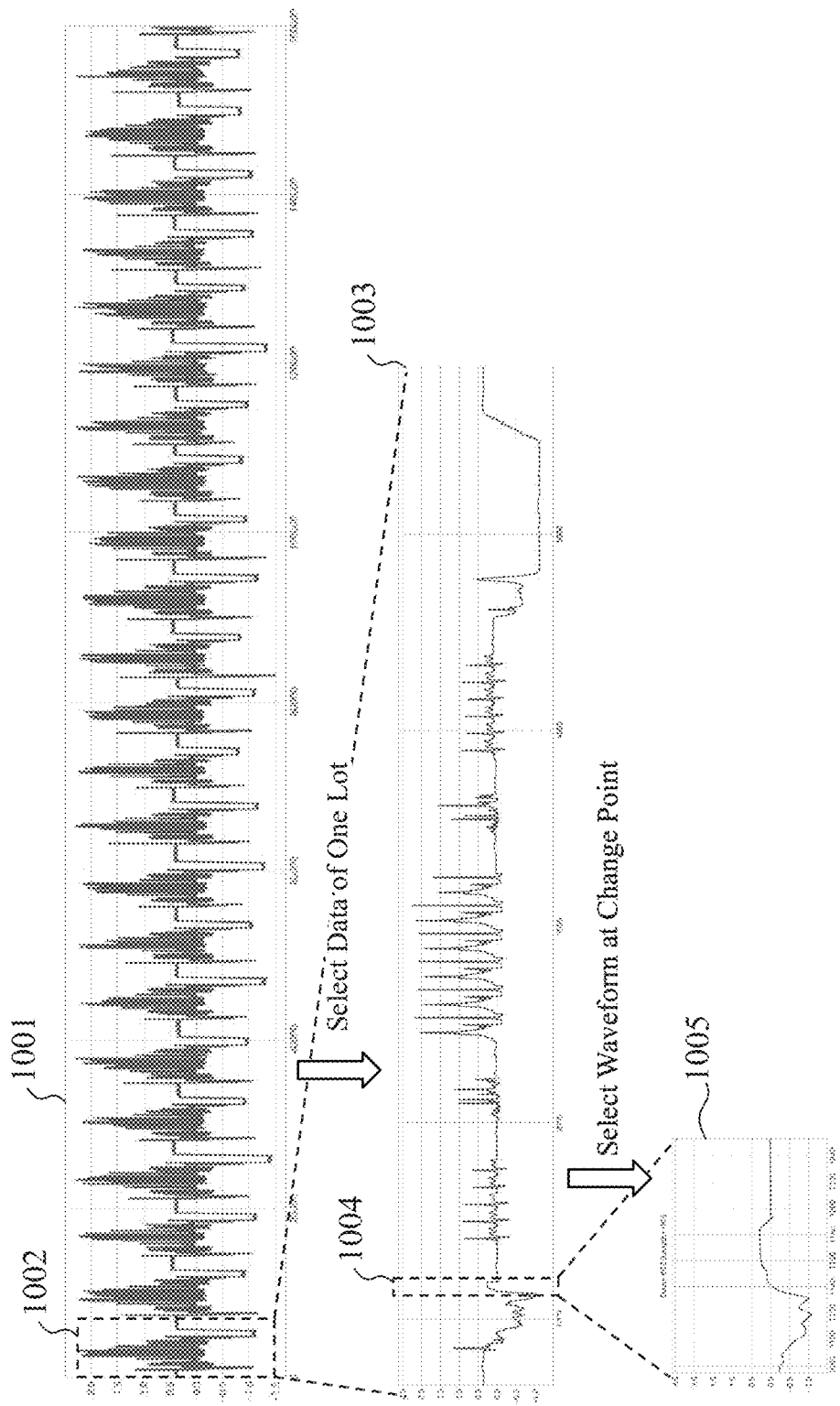
FIG. 11 is an explanatory diagram showing a processing operation of a GUI of the data processing device according to the second embodiment.

FIG. 11 is an explanatory diagram showing a processing operation of the GUI 111 of the data processing device 100A according to the second embodiment.

The GUI 111 displays the time-series data 1001 during the period in which the device is normally and stably operating on the display device such as a display. The user selects a range 1002 of time-series data corresponding to one lot of products from a pattern of waveforms appearing in the displayed time-series data 1001 using an input device (not shown) such as a mouse. The GUI 111 performs control so that time-series data 1003 within the range 1002 selected by the user is enlarged and displayed on the display device.

Further, the user specifies the change point of the operating mode from the enlarged and displayed time-series data 1003, and selects a range 1004 including the change point using the input device. The GUI 111 performs control so that waveform data 1005 within the selected range 1004 including the change point is enlarged and displayed. The user confirms the enlarged and displayed waveform data 1005, and if there is no problem in the waveform data 1005, performs an operation for labeling the waveform data 1005 as any operating mode and registering the resultant waveform data as an extraction condition. Upon receiving the operation, the extraction condition input unit 101a stores the segment extraction condition in the extraction condition storage unit 102.

Next, a process in which the extraction condition input unit 101a stores the segment extraction condition in the extraction condition storage unit 102 will be described with reference to FIG. 12.

Figure 12:
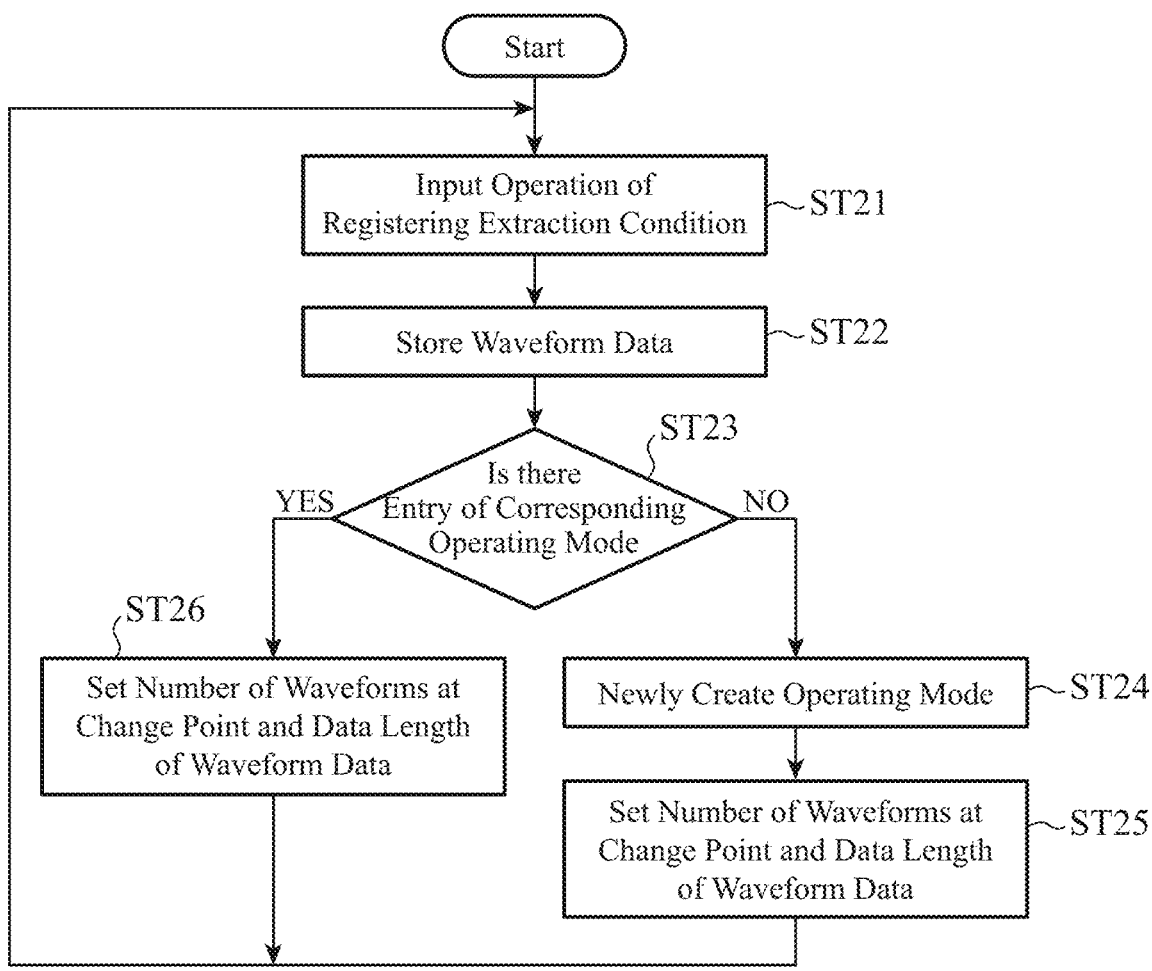
FIG. 12 is a flowchart showing an operation of an extraction condition input unit of the data processing device according to the second embodiment.

FIG. 12 is a flowchart showing the operation of the extraction condition input unit 101a of the data processing device 100A according to the second embodiment.

When receiving the operation of registering the extraction condition labeled with the operating mode (step ST21), the extraction condition input unit 101a stores the selected waveform data at change point (waveform data 1005 in FIG. 11) into the extraction condition storage unit 102 (step ST22).

Next, the extraction condition input unit 101a refers to the parameter list (for example, FIG. 5) stored in the extraction condition storage unit 102, and determines whether there is an entry of the operating mode corresponding to the operating mode 501 (step ST23). When there is no entry of the operating mode corresponding to the operating mode 501 (step ST23; NO), the extraction condition input unit 101a newly creates the corresponding operating mode 501 (step ST24). Furthermore, the extraction condition input unit 101a sets "1" to the number of waveforms at change point 502 of the newly created operating mode 501 and sets the data length of the selected waveform data at change point to the length of waveform at change point 503 (step ST25).

On the other hand, when there is an entry of the operating mode corresponding to the operating mode 501 (step ST23; YES), the extraction condition input unit 101a adds "1" to the number of waveforms at change point 502 of the corresponding operating mode 501, and adds the data length of the selected waveform data at change point to the length of waveform at change point 503 (step ST26). When the process of step ST25 or step ST26 ends, the processing returns to the process of step ST21 and the above processing is repeated.

In step ST26 described above, when the data length of the selected waveform data at change point is added to the length of waveform at change point 503, a plurality of data lengths, for example, are stored as the length of waveform at change point 503 shown in FIG. 5 in the form of a list.

As described above, in the second embodiment, the data processing device 100A includes the GUI 111 that receives selection of a display range with respect to the time-series data of the device, and enlarges and displays a subsequence within the selected display range, wherein the extraction condition input unit 101 sets the waveform data and the parameter information of the subsequence within the selected range. Thus, a load of the preparation processing before the data processing device starts the detection processing can be reduced.

Besides the above, two or more of the above embodiments can be freely combined, or arbitrary components in the embodiments can be modified or omitted, within the scope of the present invention.

INDUSTRIAL APPLICABILITY

The data processing device according to the present invention is preferably applied to a control system for controlling a process using time-series data of a device.

REFERENCE SIGNS LIST 100 and 100A: data processing device,
101 and 101a: extraction condition input unit,
102: extraction condition storage unit,
103: time-series data input unit,
104 and 104a: segment extraction unit,
105: similarity calculation unit,
106: change point detection unit,
107: operating mode determination unit,
108: information output unit,
109: determination unit,
110: determination result output unit,
111: GUI

The invention claimed is:

1. A data processing device comprising:
processing circuitry
to receive inputting of waveform data and to store segment extraction condition including a change point of a state of a device, parameter information about the waveform data, and transition information of the device;
to receive a time-series data;
to extract a segment from the received time-series data in accordance with the stored segment extraction condition;
to calculate similarity between time-series data of the device and the waveform data;
to set the state of the device on a basis of the transition information of the device;
to detect the change point from the time-series data of the device on a basis of the similarity and the state of the device, and to set a start time of a segment which is a subsequence of the time-series data and an end time of the segment;
to output, as segment information, the state of the device, the start time of the segment, and the end time of the segment and
to determine an anomaly or deterioration of the device based on the segment information.

2. The data processing device according to claim 1 wherein the processing circuitry determines a deviation degree of data or a tendency of data on a basis of the segment information.

3. The data processing device according to claim 1, wherein the processing circuitry calculates the similarity using the Euclidean distance between a subsequence cut out from the time-series data and the time-series data having a length same as a length of the subsequence.

4. The data processing device according to claim 2, wherein the processing circuitry calculates the similarity using the Euclidean distance between a subsequence cut out from the time-series data and the time-series data having a length same as a length of the subsequence.

5. The data processing device according to claim 1, wherein the processing circuitry calculates the similarity after normalizing a subsequence cut out from the time-series data and the time-series data having a length same as a length of the subsequence.

6. The data processing device according to claim 2, wherein the processing circuitry calculates the similarity after normalizing a subsequence cut out from the time-series data and the time-series data having a length same as a length of the subsequence.

7. The data processing device according to claim 3, wherein the processing circuitry detects, as the change point, a time at which the similarity assumes a minimum value and the similarity is less than or equal to a predetermined threshold from a similarity time series including similarities calculated for each time of the time-series data.

8. The data processing device according to claim 4, wherein the processing circuitry detects, as the change point, a time at which the similarity assumes a minimum value and the similarity is less than or equal to a predetermined threshold from a similarity time series including similarities calculated for each time of the time-series data.

9. The data processing device according to claim 5, wherein the processing circuitry detects, as the change point, a time at which the similarity assumes a minimum value and the similarity is less than or equal to a predetermined threshold from a similarity time series including similarities calculated for each time of the time-series data.

10. The data processing device according to claim 6, wherein the processing circuitry detects, as the change point, a time at which the similarity assumes a minimum value and the similarity is less than or equal to a predetermined threshold from a similarity time series including similarities calculated for each time of the time-series data.

11. The data processing device according to claim 1, wherein
the processing circuitry receives selection of a display range with respect to time-series data of the device, and enlarges and displays a subsequence within the selected display range, and
sets the waveform data and the parameter information of the subsequence within the selected range.

12. The data processing device according to claim 2, wherein
the processing circuitry receives selection of a display range with respect to time-series data of the device, and enlarges and displays a subsequence within the selected display range, and
sets the waveform data and the parameter information of the subsequence within the selected range.

13. A data processing method comprising:
receiving inputting of waveform data and storing segment extraction condition including a change point of a state of a device, parameter information about the waveform data, and transition information of the device;

receiving time-series data;

extracting a segment from the received time-series data in accordance with the stored segment extraction condition;

calculating similarity between time-series data of the device and the waveform data;

setting the state of the device on a basis of the transition information of the device;

detecting the change point from the time-series data of the device on a basis of the calculated similarity and the set state of the device, and setting a start time of a segment which is a subsequence of the time-series data and an end time of the segment;

outputting the state of the device, the start time of the segment, and the end time of the segment and determining an anomaly or deterioration of the device based on the segment information.

\* \* \* \* \*